United States Patent [19]

Davis

[11] 4,029,201
[45] June 14, 1977

[54] CONVEYOR APPARATUS

[75] Inventor: Bernard H. Davis, Stoney Creek, Canada

[73] Assignee: H. H. Robertson Company, Pittsburgh, Pa.

[22] Filed: Oct. 2, 1975

[21] Appl. No.: 618,926

[52] U.S. Cl. .............................................. 198/858
[51] Int. Cl.² .................................... B65G 21/12
[58] Field of Search .......... 198/110, 190, 854, 858, 198/835; 242/67.4, 68, 75.4; 100/222; 271/DIG. 9

[56] References Cited

UNITED STATES PATENTS

| 182,071 | 9/1876 | Hill | 242/68 |
|---|---|---|---|
| 1,937,077 | 11/1933 | West | 242/67.4 |
| 3,176,928 | 4/1965 | Saunders | 242/68 X |
| 3,872,695 | 3/1975 | Busek | 100/222 |

*Primary Examiner*—Evon C. Blunk
*Assistant Examiner*—Douglas D. Watts
*Attorney, Agent, or Firm*—Harry B. Keck; George E. Manias

[57] ABSTRACT

Conveyor apparatus of the non-endless type useful in combination with a press having a stationary lower bed or platen and an upper platen supported above the lower platen by means disposed along the opposite longitudinal sides of the platens. The conveyor apparatus includes feed and take-up rolls, one at each end of the bed, and belt means extending between the rolls and over the bed. Distinct cradle means support each of the rolls for rotation about horizontal axes. The arrangement is such that when the belt means is worn or broken the feed roll and/or the take-up roll may be vertically disengaged from the cradle means thereby to facilitate rapid replacement of the belt means.

The conveyor apparatus also is provided with first and second drive means, connectd respectively to the take-up roll and the feed roll, which are individually operable to rotate the rolls about their respective axes to move the belt in a forward direction and in a reverse direction. First and second brake means connected respectively to the feed roll and to the take-up roll are individually operable to provide resistance to the rotation of one roll when the other roll is being driven, thereby to maintain the belt in a taut condition during movement thereof in the forward direction and in the reverse direction.

17 Claims, 9 Drawing Figures

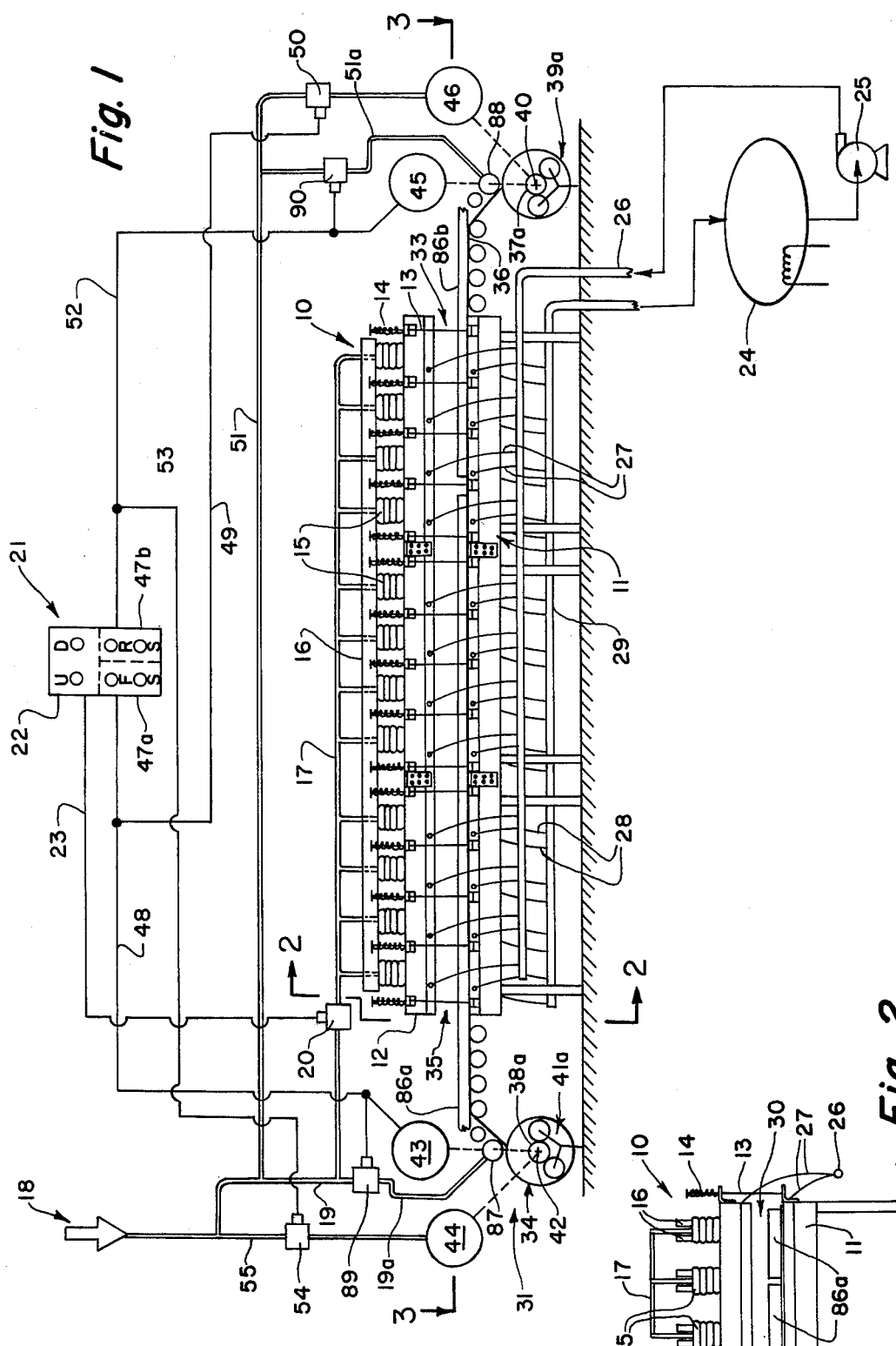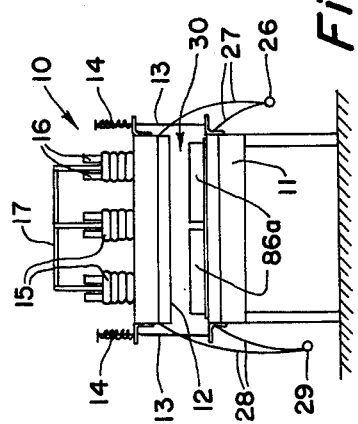

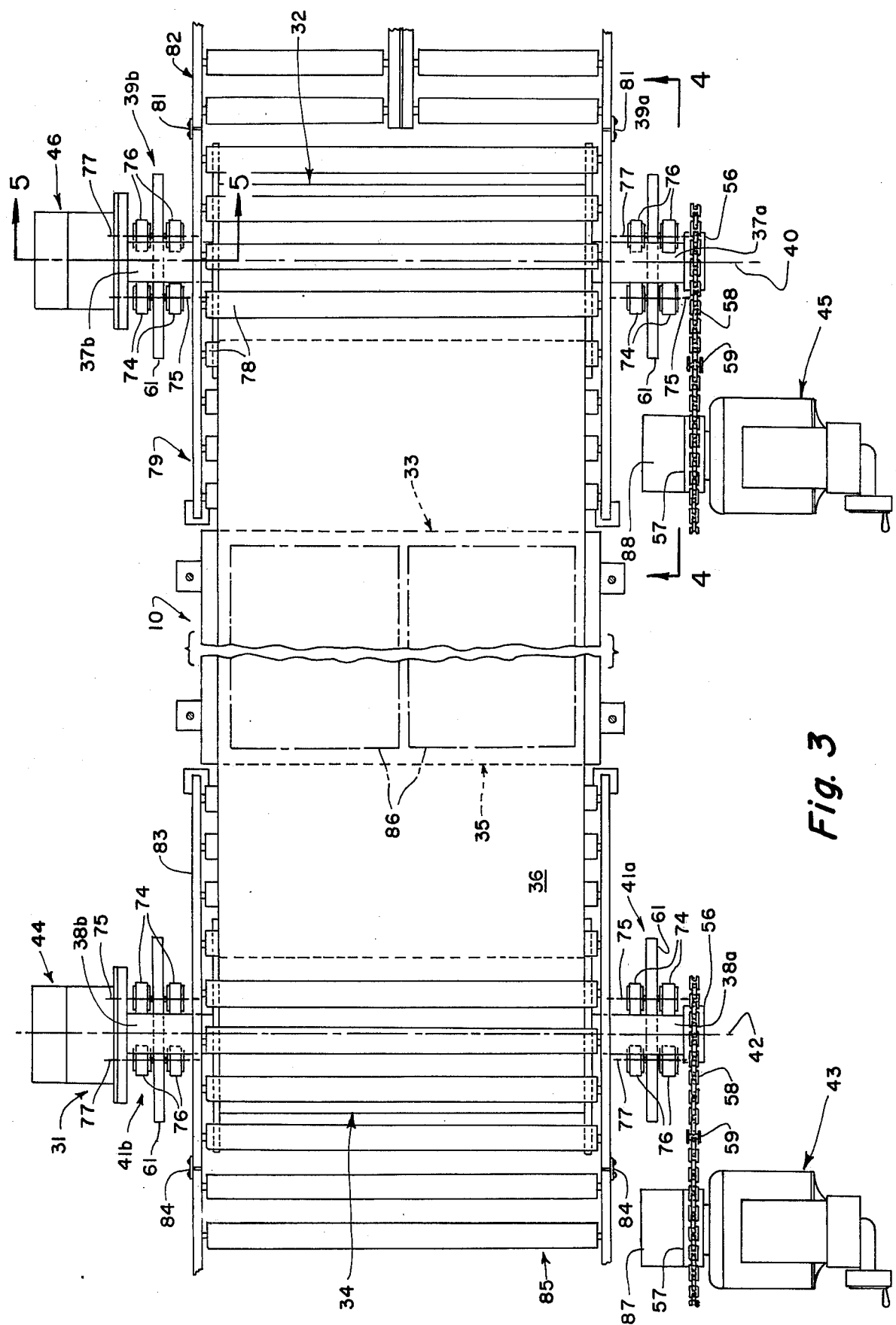

CONVEYOR APPARATUS

BACKGROUND OF THE INVENTION

1. Field of the Invention:

This invention relates to conveyor apparatus and more particularly to conveyor apparatus of the non-endless type having spaced-apart feed and take-up rolls, and belt means movable therebetween in forward and reverse directions.

2. Description of the Prior Art:

Heretofore conveyor apparatus utilizing an endless belt has been used in conjunction with various process apparatus including presses. The replacement of a worn or broken endless belt was a costly and time consuming operation which necessitated closing down the process apparatus for extended periods. Endless belt conveyors also require complex belt tensioning devices by which belt slack due to stretching and thermal expansion, for example, may be eliminated.

SUMMARY OF THE INVENTION

The principal object of this invention is to provide conveyor apparatus having belt means of the non-endless type, movable between feed and take-up rolls for transporting articles into and through a press.

Another object of this invention is to provide conveyor apparatus having feed and take-up rolls, either or both of which are readily removable for replacement of the belt means.

Still another object of this invention is to provide a drive arrangement by which the belt means is maintained in a taut condition.

The present invention provides conveyor apparatus useful in combination with a press of the type having stationary lower bed or platen and an upper platen supported above the lower platen by support means disposed along the opposite longitudinal sides of the platens. The present conveyor apparatus comprises feed and take-up rolls positioned at the opposite ends of the bed. Belt means extends from the feed roll over the bed to the take-up roll. First cradle means provided at each end of the feed roll support the same for rotation about a first roll axis extending transversely of the bed. Second cradle means provided at each end of the take-up roll support the same for rotation about a second roll axis substantially parallel to the first roll axis. The first and second cradle means are configured such that the feed roll and/or the take-up roll may be disengaged vertically therefrom to permit rapid replacement of the belt means in the event the belt means becomes worn or is broken.

The present conveyor apparatus additionally includes first drive means detachably connected to and operable to rotate the take-up roll about the second roll axis thereby to move the belt means over the bed in a forward direction. Second drive means is provided which is detachably connected to and operable to rotate the feed roll about the first roll axis thereby to move the belt means over the bed in a reverse direction. The feed roll and the take-up roll have, respectively, first and second brake means detachably connected thereto. The arrangement is such that when the first drive means rotates the take-up roll, the first brake means provides resistance to the rotation of the feed roll thereby to maintain the belt means in a taut condition during movement thereof in the forward direction; and when the second drive means rotates the feed roll, the second brake means provides resistance to the rotation of the take-up roll, thereby to maintain the belt means in a taut condition during movement thereof in the reverse direction.

The present conveyor apparatus is particularly useful in transporting semi-finished panels into the press for curing of adhesive layers, for example. The panels may be transported in side-by-side relation into and through the press. The belt means employed in the present conveyor apparatus may comprise a single belt having a width greater than the combined width of the two panels. Alternatively, the belt means may comprise first and second belts disposed in side-by-side relation. In the two belt arrangement, the feed roll and the take-up roll each comprise a roll segment connected to the first belt and being supported by the cradle means for rotation about the roll axis. A second roll segment connected to the second belt is rotatably carried by the first roll segment for rotation therewith about the roll axis. Clutch means connecting the first and second roll segments provides rotary slipping of one roll segment relative to the other roll segment, thereby to accommodate changes in the length of the belts during movement thereof in the forward and reverse directions.

BRIEF DESCRIPTION OF THE DRAWINGS

FIG. 1 is a view schematically illustrating a press utilizing the conveyor apparatus of this invention;

FIG. 2 is an end view of the press as seen from the line 2—2 of FIG. 1;

FIG. 3 is a cross-sectional view taken along the line 3—3 of FIG. 1;

DESCRIPTION OF THE PREFERRED EMBODIMENTS

Figures 4, 5, 6, 7, 9:
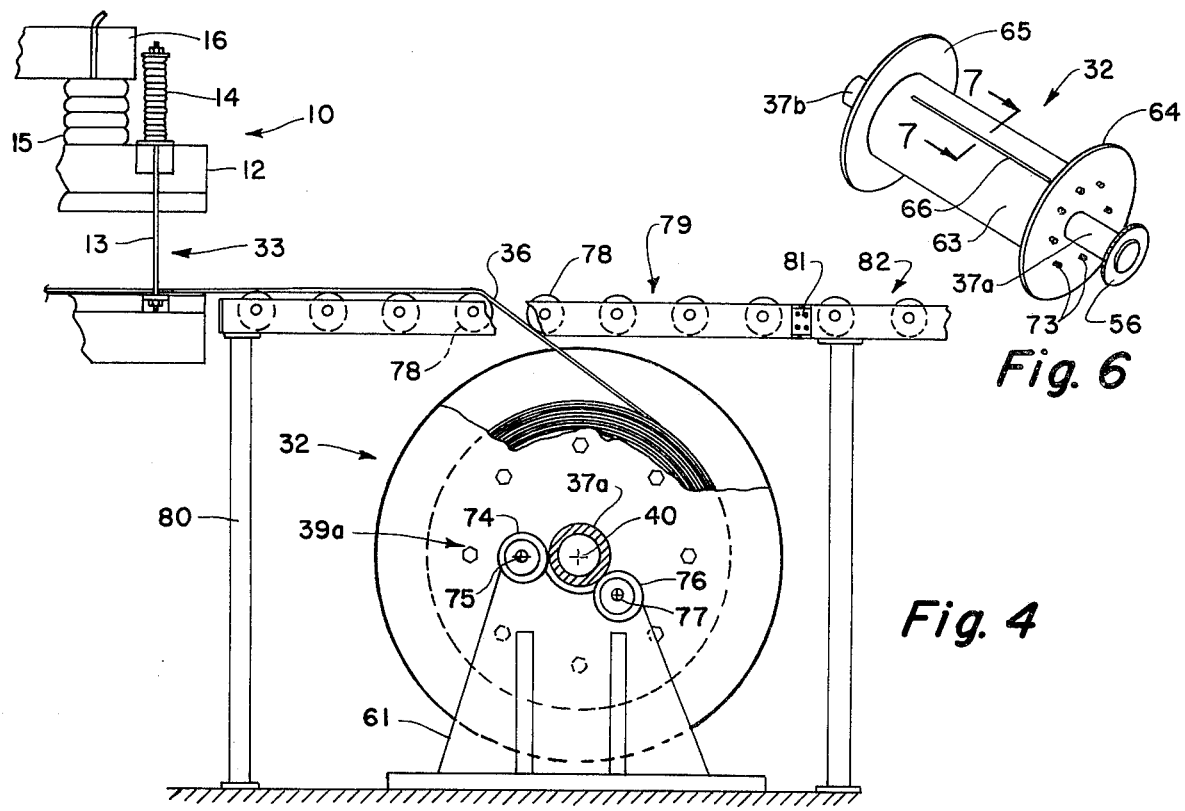
FIG. 4 is a fragmentary cross-sectional view taken along the line 4—4 of FIG. 3.
FIG. 5 is a fragmentary cross-sectional view taken along the line 5—5 of FIG. 3.
FIG. 6 is an isometric view illustrating the feed roll utilized in the conveyor apparatus of this invention.
FIG. 7 is a cross-sectional view taken along the line 7—7 of FIG. 6.
FIG. 9 is a cross-sectional view taken along the line 9—9 of FIG. 8.

FIGS. 1 and 2 illustrate a press 10 having a stationary lower horizontal, generally rectangular bed 11 and a horizontal platen 12 positioned above and confronting the horizontal bed 11. Means in the form of rods 13 and springs 14 (FIGS. 1, 2 and 4) is provided along the opposite longitudinal edges (FIG. 2) of the bed 11 and platen 12 for supporting the platen 12 for movement toward and away from the bed 11. The platen 12 is moved by plural air pods 15 acting against stationary bars 16. The air pods 15 receive pressurized air by way of a manifold 17. Pressurized air from source 18 is communicated through conduit means 19 and a control valve, such as the solenoid operated valve 20, to the manifold 17. The arrangement is such that on activation of the valve 20 pressurized air is communicated to the pods 15 thereby moving the platen 12 downwardly toward the bed 11. When the valve 20 is deactivated, the pressurized air is exhausted from the pods 15 whereby the springs 14 raise the platen 12. An operator panel 21 includes a press actuator section 22 which is connected to the valve 20 by wiring 23.

The bed 11 and platen 12 are each supplied with a heating medium, such as oil, to maintain the bed 11 and platen 12 at a selected temperature. The heating medium is stored and heated in a reservoir 24 and is conveyed therefrom by pump 25 to a header 26 and thence through plural flexible conduits 27 to the bed 11 and platen 12. The heating medium is returned through plural flexible conduits 28 to a return line 29 communicating with the reservoir 24.

As best seen in FIG. 2, the press 10 presents a passageway 30 between the bed 11 and the platen 12 which is restricted by the rods 13 and the flexible conduits 27, 28 leading to the platen 12.

In accordance with the present invention, conveyor apparatus 31 is provided comprising a feed roll 32 positioned at one end or entrance end 33 of the press 10, a take-up roll 34 positioned at the opposite end or exit end 35 of the press 10, and belt means 36 extending from the feed roll 32, over the bed 11 to the take-up roll 34. The feed and take-up rolls 32, 34 present, respectively, axle ends 37a, 37b and 38 a, 38b (only one visible) extending from the opposite sides of the rolls 32, 34. First cradle means 39a, 39b (only one visible) provided at each end of the feed roll 32 support the same for rotation about a first roll axis 40 extending transversely of the bed 11. Second cradle means 41a, 41b (only one visible) provided at each end of the take-up roll 34 support the same for rotation about a second roll axis 42 which is substantially parallel to the first roll axis 40.

The feed and take-up rolls 32, 34 have operating elements associated therewith for rotating the same to move the belt means 36 in forward and reverse directions. These elements include second brake means 44, first drive means 43, and first clutch means 87 all operatively associated with the take-up roll 34; and first brake means 46, second drive means 45, and second clutch means 88 all operatively associated with the feed roll 32. The operator panel 21 has drive actuator sections 47a, 47b controlling the movement of the belt means 36 in the forward and reverse directions, respectively. Wiring 48 connects the first brake means 43 and a control valve, such as solenoid operated valve 89 to the drive actuator section 47a. Wiring 49 extends from the wiring 48 to a control valve, such as solenoid operated valve 50. The first and second brake means 46, 44 and the first and second clutch means 87, 88 preferably comprise air operated elements. Pressurized air from source 18 is conducted through conduit means 51 containing the control valve 50 to the first brake means 46 through conduit means 51a containing the control valve 90 to the second clutch means 88. Pressurized air from source 18 is conducted through conduit means 19 and conduit means 19a which contain the control valve 89 to the first clutch means 87. The second drive means 45 and the valve 90 are connected to the drive actuator section 47b by wiring 52. Wiring 53 extends from the wiring 52 to a control valve, such as a solenoid operated valve 54. The valves 50, 54, 89 and 90 control the introduction and exhaustion of pressurized air from the source 18 to the first and second brake means 46, 44 and the first and second clutch means 87, 88.

The arrangement is such that on activation, the first drive means 43 being operatively connected to the take-up roll 34 by the first clutch means 87, rotates the same about the second axis 42 in a counterclockwise direction, as viewed in FIG. 1, to move the belt means 36 over the bed in a forward direction. The first brake means 46, actuated simultaneously with the actuation of the first drive means 43, provides resistance to the rotation of the feed roll 32 thereby to maintain the belt means 36 in a taut condition during movement thereof in the forward direction. The second clutch means 88 being deactivated on actuation of the first drive means, disconnects the second drive means 45 from the feed roll 32.

The arrangement also is such that on actuation, the second drive means 45 being operatively connected to the feed roll 32 by the second clutch means 88, rotates the feed roll 32 about the first roll axis 40 in a clockwise direction, as viewed in FIG. 1, to move the belt means 36 over the bed 11 in a reverse direction. The second brake means 44 which is actuated simultaneously with the actuation of the second drive means 45, provides resistance to the rotation of the take-up roll 34, thereby to maintain the belt means 36 in a taut condition during movement thereof in the reverse direction. The first clutch means 87 being deactivated on actuation of the second drive means 45, disconnects the first drive means 43 from the take-up roll 34.

A more detailed description of the present conveyor apparatus 31 will now be provided with reference to FIGS. 3 through 6.

DRIVE MEANS

It will be observed in FIG. 3 that driven sprockets 56 are secured to the axle ends 37a, 38a; and that drive sprockets 57 are operatively connected to the first and second drive means 43, 45 by the first and second clutch means 87, 88 respectively. Each of the driven sprockets 56 is connected to the adjacent drive sprocket 57 by a drive chain 58. Each of the drive chains 58 includes a disconnect link 59 by which the drive chain 58 may be disconnected from the sprockets 56, 57. Thus the first and second drive means 43, 45 are detachably connected to the take-up and feed rolls 34, 32, respectively.

BRAKE MEANS

The first and second brake means 46, 44 are operatively connected to the axle ends 38b, 37b, respectively, presented on the opposite side of the take-up and feed rolls 34, 32. It will be observed in FIG. 5 that the first brake means 46 presents a flange extension 60 connected to a vertical plate 61 of the cradle means 39 by fastening means 62. Thus connected, the first brake means 46 is prevented from rotating in either direction with the axle segment 37b. Although not illustrated, the second brake means 44 is similarly connected to the cradle means 41b.

FEED AND TAKE-UP ROLLS

It will be observed in FIG. 6 that the feed roll 32 comprises a drum 63 having end flanges 64, 65 from which project the axle ends 37a, 37b, respectively. The axle end 37a presents the driven sprocket 56. The drum 36 is provided with a longitudinal slot 66 for receiving one end of the belt means 36. As can be seen in FIG. 7, an end 67 of the belt means 36 extends through the slot 66 and is wrapped around a rectangular bar 68. A clamping plate 69 has an edge portion 70 engaging a boss 71 and an opposite edge portion 72 overlying the belt end 67. Fasteners 73 (only one visible) urge the clamping plate 69 toward the drum 63 thereby clamping the belt end 67 and the bar 68 between the edge portion 72 and the drum 63. When it becomes necessary to change the belt means 36, access to the interior of the drum 63 is gained by removing the fasteners 73 (FIG. 6) which secure the end flange 64 to the drum 63.

CRADLE MEANS

Referring to FIG. 3, the first cradle means 39a, 39b have identical configurations. The second cradle means 41a, 41b have identical configurations. The first cradle means 39 differ from the second cradle means 41 only in that they are mirror images of each.

Referring to FIGS. 3 and 4, the first cradle means 39a comprises first bearing means 74, one positioned on each side of the plate 61 and having a common bearing axis 75; and second bearing means 76, one positioned on each side of the plate 61, being angularly spaced-apart from the first bearing means 74 and having a common bearing axis 77. As best seen in FIG. 4, the first bearing means 74 are positioned between the axle end 37a and the press entrance end 33, whereas the second bearing means 76 are positioned on the opposite side of the axle end 37a. In the preferred arrangement, the bearing axis 75 of the first bearing means 74 is at substantially the same level as the roll axis 40—the first bearing means 74 being positioned to accept thrust forces applied thereto during movement of the belt means 36 in the forward and reverse directions. The second bearing means 76 are positioned such that the bearing axis 77 thereof is at a level below that of the bearing axis 75 and the first roll axis 40.

The foregoing description applies equally to the first bearing means 39d and to the second bearing means 41a, 41b. It will be observed in FIG. 3 that the orientation of the first and second bearing means 74, 76 of the second cradle means 41 is reversed. That is, the first bearing means 74 are positioned between the axle ends 38a, 38b and the press exit end 35.

BELT MEANS

In the preferred arrangement, the belt means 36 comprises a single belt having opposite ends detachably connected to the feed and take-up rolls 32, 34 in the manner illustrated in FIG. 7. The belt means 36 may comprise a galvanized steel or stainless steel belt having a thickness in the range of 0.018 to 0.015 inches and preferably 0.015 inches; and a length of approximately 2,000 feet. Alternatively, the belt means 36 may comprise any other suitable material, for example, Teflon-impregnated woven glass fiber belt, heavy long fibered Kraft paper, and the like. Such thin belts provide an inventory of belt length adequate for a given operating period without requiring unusually large feed and take-up rolls.

It will be observed in FIGS. 3 and 4 that the belt means 36 extends from the feed roll 32 upwardly between rollers 78 of a roller conveyor segment 79. The roller conveyor segment 79 is supported at one end by posts 80 (FIG. 4) and has its opposite end detachably connected as at 81 to a feed roller conveyor 82. It will be observed in FIG. 3 that a second roller conveyor segment 83 is provided adjacent to the discharge end 35 of the press 10. The second roller conveyor segment 83 is detachably connected as at 84 to a discharge conveyor 85. The feed and take-up rolls 32, 34 are positioned entirely below the roller conveyor segments 79, 83 and hence entirely below the upper surface of the bed 11.

When the belt means 36 becomes worn and requires replacement, the belt means 36 is, for example, disconnected from the take-up roll 34 and is wound onto the feed roll 32. The roller conveyor segment 79 is disconnected from the feed conveyor 82 and removed. Thereafter, the drive chain 58 of the second drive means 45 is separated by removing the disconnect link 59; and the fastening means 62 (FIG. 5) is removed freeing the first brake means 46. Thereafter the entire feed roll 32 may be lifted from the cradle means 39a, 39b to a location whereat the worn belt may be replaced. The feed roller 32 with new belt means wound thereon is replaced by reversing the above described process.

One commercial embodiment of the present conveyor apparatus utilizes belt means comprising a Teflon-impregnated, woven glass fiber belt having a thickness of 0.024 inches, a length of 200 feet, and a width of 62 inches. The conveyor apparatus is used in conjunction with a heating press, such as illustrated in FIGS. 1 and 2 wherein the working surfaces of the bed 11 and platen 12 are 30.5 feet long and 68 inches wide. The arrangement is such that two semi-finished building panels, illustrated in dash-dot outline at 86 in FIG. 3, each having an overall width of 32 inches, are presented in side-by-side relation on the belt means 36 for transport into and through the press 10.

OPERATION

With the upper platen 12 in a raised position, the first drive means 43 and first brake means 46 are activated to move the belt means 36 and thereby discharging the finished building panels 86a through the exit end 35 while, simultaneously, admitting semi-finished building panels 86b through the entrance end 33. The first drive means 43 and first brake means 46 are deactivated when the semi-finished building panels 86b are entirely within the press 10. Thereafter the pods 15 are pressurized by activating the solenoid valve 20, to lower the platen 12 into clamping engagement with the semi-finished building panels 86b. After a selected residence time, the solenoid valve 20 is opened exhausting the air from the pods 50 whereupon the springs 14 raise the platen 12 to the elevated position illustrated in FIG. 1. The above described cycle is repeated during a working shift or some other selected period, whereby a series of semi-finished building panels are sequentially introduced into the press and withdrawn therefrom as finished products. At the end of the working shift or other selected period, the second drive means 45 and the second brake means 44 are activated to rewind the belt means onto the feed roll 32. The conveyor apparatus 31 is now ready for a new batch of semi-finished building panels.

ALTERNATIVE EMBODIMENT

Figure 8:
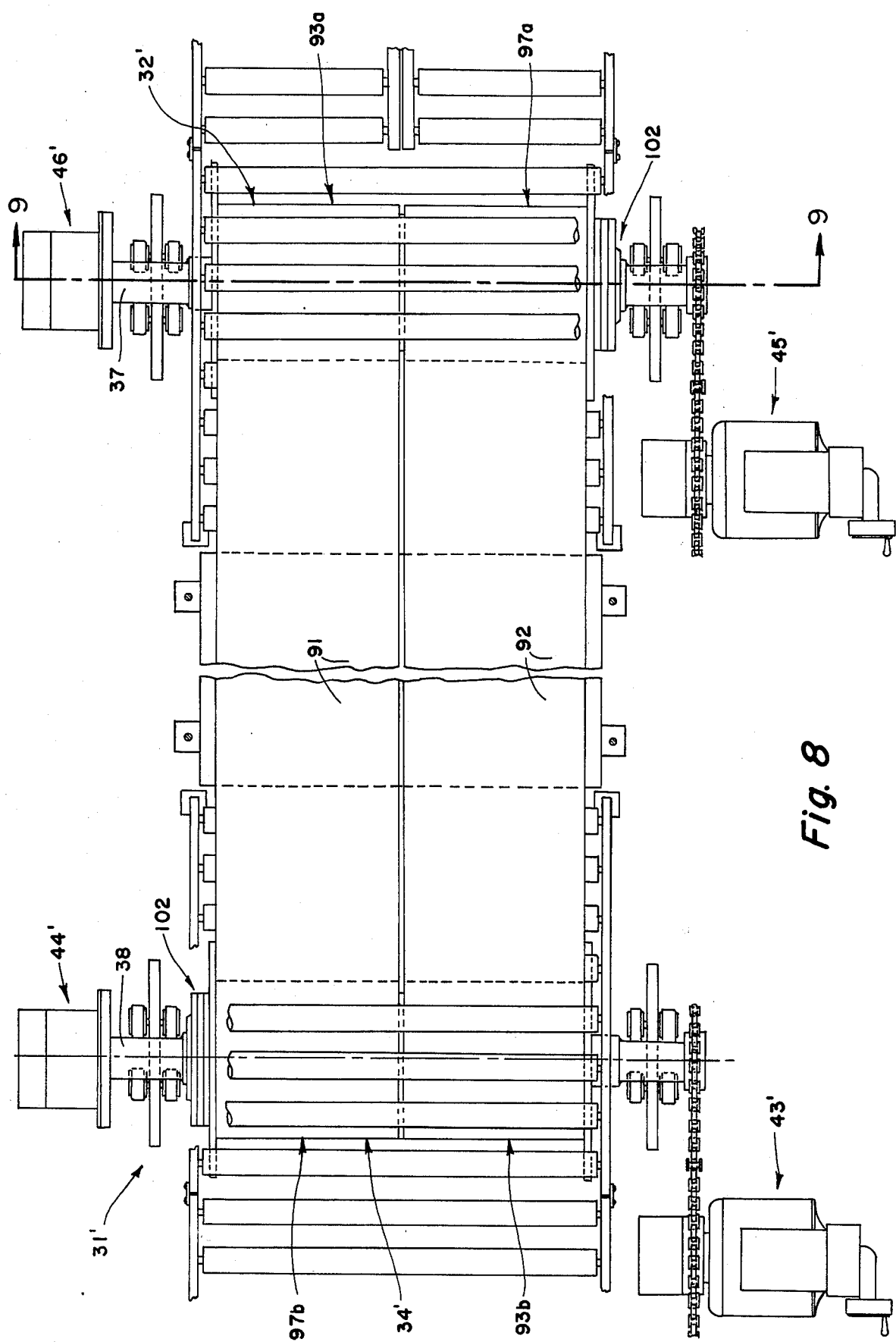
FIG. 8 is a broken cross-sectional view, similar to FIG. 3, illustrating an alternative arrangement of the belt means.

FIG. 8 illustrates conveyor apparatus 31' wherein the belt means comprises first and second belts 91, 92 disposed in side-by-side relation. The feed roll 32' and the take-up roll 34' accommodate the first and second belts 91, 92. The construction of the feed roll 32' will now be described with reference to FIG. 9. Corresponding numerals will be employed to identify corresponding parts heretofore described.

The feed roll 32' comprises a first roll segment 93 including a drum 94 having an end flange 95 and an inner end wall 96 each rigidly connected to the axle 37 which is supported for rotation about the roll axis 40 by the cradle means 39a, 39b.

The feed roll 32' additionally includes a second roll segment 97 including a drum 98 having an end flange 99 and an inner end wall 100 adjacent to the inner end wall 96. The second roll segment 97 is supported on the axle 37 by bearing means, such as bronze bushings 101 for rotation about the roll axis 40 and for movement longitudinally of the axle 37. Torque limiting means 102 is provided which permits controlled rotary slipping of the roll segment 97 relative to the positively driven roll segment 93 so as to accommodate changes in the length of the belts 91, 92 during movement thereof in the forward and reverse directions. The torque limiting means 102 includes a first resistance plate 103 positioned between and engaged by the inner end walls 96, 100. A second resistance plate 104 carried by the axle 37, engages the end flange 99 of the second roll segment 97. A hub 105, threadedly engaged on the threaded portion 106 of the axle 37, compresses a spring 107 between the hub 105 and the second resistance plate 104. The torque at which the second roll segment 97 will slip relative to the axle 37 is controlled by adjusting the compression of the spring 107.

Reverting to FIG. 8, it will be observed that the takeup roll 34' is a mirror image of the feed roll 32'. That is, the first belt means 91 extends from the first roll segment 93a of the feed roll 32' to the second roll segment 97b of the take-up roll 34'; and that the second belt means 92 extends from the second roll segment 97a of the feed roll 32' to the first roll segment 93b of the take-up roll 34'. It will also be observed in FIG. 8 that the torque limiting means 102 of the take-up roll 34' is associated with the second roll segment 97a thereof.

The torque limiting means 102 of the feed and take-up rolls 32', 34' permit controlled rotary slipping of the second roll segments 97a relative to the first roll segments 93a, thereby to accommodate changes in the length of the belt means 91, 92 during movement thereof in the forward and reverse directions. Although the belt means 91, 92 are formed from the same material, they may have slightly different thermal expansion coefficients or may undergo different elongation rates during forced movement in either direction. The controlled rotary slippage provided by the torque limiting means 102 accommodates changes in the belt lengths.

I claim:

1. Conveyor apparatus comprising:
   a horizontal, generally rectangular, stationary bed;
   a feed roll positioned at one end of said bed;
   a take-up roll positioned at the opposite end of said bed;
   conveying means extending from said feed roll over said bed to said take-up roll;
   first cradle means at each end of said feed roll supporting the same for rotation about a first roll axis extending transversely of said bed;
   second cradle means at each end of said take-up roll supporting the same for rotation about a second roll axis substantially parallel to said first roll axis;
   first drive means for rotating said take-up roll about said second roll axis, thereby to move said belt means over said bed in a forward direction;
   second drive means operable independently of said first drive means for rotating said feed roll about said first roll axis, thereby to move said belt means over said bed in a reverse direction;
   first clutch means for operatively connecting said first drive means to said take-up roll during movement of said belt means in said forward direction, and for disconnecting said first drive means from said take-up roll during movement of said belt means in said reverse direction; and
   second clutch means for operatively connecting said second drive means to said feed roll during movement of said belt means in said reverse direction and for disconnecting said second drive means from said feed roll during movement of said belt means in said forward direction.

2. The conveyor apparatus of claim 1 wherein said belt means has opposite ends detachably connected to said feed roll and to said take-up roll.

3. The conveyor apparatus of claim 1 including first brake means detachably connected to said feed roll and distinct from said second drive means, providing resistance to the rotation of said feed roll during operation of said first drive means, thereby to maintain said belt means in a taut condition during movement thereof in said forward direction.

4. The conveyor apparatus of claim 3 including second brake means detachably connected to said take-up roll and distinct from said first drive means, providing resistance to the rotation of said take-up roll during operation of said second drive means, thereby to maintain said belt means in a taut condition during movement thereof in said reverse direction.

5. The conveyor apparatus of claim 4 wherein said first brake means and said second brake means each comprise an air operated brake.

6. The conveyor apparatus of claim 1 wherein said feed roll and said take-up roll are positioned entirely below the level of the top surface of said bed.

7. The conveyor apparatus of claim 1 wherein said belt means comprises first and second belt means disposed in side-by-side relation.

8. Conveyor apparatus comprising:
   a horizontal, generally rectangular bed;
   a feed roll positioned at one end of said bed;
   a take-up roll positioned at the opposite end of said bed;
   belt means extending from said feed roll over said bed to said take-up roll and comprising first and second belt means disposed in side-by-side relation;
   first cradle means at each end of said feed roll supporting the same for rotation about a first roll axis extending transversely of said bed;
   second cradle means at each end of said take-up roll supporting the same for rotation about a second roll axis substantially parallel to said first roll axis;
   first drive means detachably connected to and operable to rotate said take-up roll about said second roll axis thereby to move said belt means over said bed in a forward direction; and
   second drive means detachably connected to and operable to rotate said feed roll about said first roll axis, thereby to move said belt means over said bed in a reverse direction;
   said feed roll and said take-up roll each comprising:
   a first segment supported by the cradle means for rotation about the roll axis;
   a second roll segment rotatably carried by said first roll segment for rotation therewith about the roll axis; and
   torque limiting means connecting said first roll segment to said second roll segment, providing rotational slipping of one roll segment relative to the other segment.

9. The conveyor apparatus of claim 8 wherein
said first belt means extends from the first roll segment of said feed roll to the second roll segment of said take-up roll; and
said second belt means extends from the second roll segment of said feed roll to the first roll segment of said take-up roll.

10. The conveyor apparatus of claim 8 wherein said feed roll and said take-up roll each include
an axle supported by the cradle means and rotatable about the roll axis; and
the first roll segment being rigidly secured to said axle.

11. The conveyor apparatus of claim 10 including
bushing means supporting the second roll segment for rotation about said axle and for movement longitudinally along said axle.

12. The conveyor apparatus of claim 8 wherein said feed roll and said take-up roll each include
a friction plate disposed between and engaged by the first roll segment and the second roll segment.

13. Conveyor apparatus comprising:
a horizontal, generally rectangular bed;
a feed roll positioned at one end of said bed;
a take-up roll positioned at the opposite end of said bed;
belt means extending from said feed roll over said bed to said take-up roll;
first cradle means at each end of said feed roll supporting the same for rotation about a first roll axis extending transversely of said bed;
second cradle means at each end of said take-up roll supporting the same for rotation about a second roll axis substantially parallel to said first roll axis;
first drive means detachably connected to and operable to rotate said take-up roll about said second roll axis thereby to move said belt means over said bed in a forward direction;
second drive means detachably connected to and operable to rotate said feed roll about said first roll axis, thereby to move said belt means over said bed in a reverse direction;
axle ends, one extending from each end of said feed roll and from each end of said take-up roll; and
each said cradle means comprising
first bearing means engaging the axle end, being positioned between the roll axis and the end of said bed, and having a bearing axis substantially parallel with the roll axis; and
second bearing means engaging the axle end, being angularly spaced apart from said first journal means, and having a journal axis at a level below the journal axis of said first bearing means.

14. The conveyor apparatus of claim 13 wherein the bearing axis of said first bearing means and the roll axis are at substantially the same level.

15. The conveyor apparatus of claim 1 including
a platen positioned above and confronting said horizontal bed; and
support means supporting said platen for movement toward and away from said bed.

16. The conveyor apparatus of claim 15 wherein said support means extend between said platen and said bed and spaced from the opposite longitudinal sides of said belt means.

17. The conveyor apparatus of claim 1 wherein said first clutch means and said second clutch means each comprise an air operated clutch.

* * * * *